(12) United States Patent
Bohn

(10) Patent No.: US 6,292,274 B1
(45) Date of Patent: Sep. 18, 2001

(54) PORTABLE SCANNER WITH TILTING BODY DESIGN

(75) Inventor: David D. Bohn, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/210,067

(22) Filed: Dec. 11, 1998

(51) Int. Cl.[7] ............................................. H04N 1/024
(52) U.S. Cl. ............................................................. 358/473
(58) Field of Search .................................... 358/473, 472, 358/474, 471, 486; 385/313, 312

(56) References Cited

U.S. PATENT DOCUMENTS

| | | | |
|---|---|---|---|
| 3,918,028 | 11/1975 | Humphrey et al. | 340/146.3 |
| 4,376,348 | 3/1983 | Ackeret | 40/513 |
| 4,523,235 | 6/1985 | Rajchman | 358/472 |
| 4,868,676 | 9/1989 | Matsuura et al. | 358/296 |
| 4,899,228 * | 2/1990 | Saro et al. | 358/473 |
| 5,089,712 | 2/1992 | Holland | 250/557 |
| 5,115,227 * | 5/1992 | Keiji | 358/473 |
| 5,306,908 | 4/1994 | McConica et al. | 250/234 |
| 5,381,020 | 1/1995 | Kochis et al. | 250/566 |
| 5,552,597 | 9/1996 | McConica | 250/234 |
| 5,578,813 | 11/1996 | Allen et al. | 250/208.1 |
| 5,586,212 | 12/1996 | McConica et al. | 385/146 |
| 5,595,445 * | 1/1997 | Bobry | 358/473 |
| 5,748,338 * | 5/1998 | Lee | 358/473 |
| 5,751,840 | 5/1998 | Raterman et al. | 382/135 |
| 5,812,172 | 9/1998 | Yamada | 347/171 |
| 5,850,058 * | 12/1998 | Tano et al. | 382/313 |
| 5,923,444 * | 7/1999 | Bohn | 358/473 |
| 5,988,900 * | 11/1999 | Bobry | 358/473 |
| 6,002,124 * | 12/1999 | Bohn et al. | 250/208.1 |
| 6,033,086 * | 3/2000 | Bohn | 358/473 |
| 6,097,507 * | 8/2000 | Bohn | 358/473 |
| 6,118,553 * | 9/2000 | Berg | 358/473 |

* cited by examiner

Primary Examiner—Cheukfan Lee

(57) ABSTRACT

Hand-held image scanner apparatus may comprise a body having first and second side walls positioned in spaced-apart relation so that the second side wall is located a spaced distance from the first side wall. The body also includes a convex face portion that extends between the first and second side walls and defines a contact axis that extends along a lateral direction and that is located longitudinally between the first and second side walls. The convex face portion allows the body to be tilted about the contact axis when the convex face portion is in contact with an object to be scanned. An image sensing system mounted within the body is responsive to image light reflected by the object being scanned and produces an image signal based on the image light. The image sensing system is optically coupled to an image light opening in the convex face portion of the body so that image light passing through the image light opening is received by the image sensing system.

20 Claims, 6 Drawing Sheets

PORTABLE SCANNER WITH TILTING BODY DESIGN

FIELD OF THE INVENTION

This invention relates to imaging devices in general and more specifically to hand-held or portable optical scanners.

BACKGROUND

Optical scanner devices are well-known in the art and may be used to produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation is complete by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a plurality of light emitting diodes (LEDs), although other types of light sources, such as fluorescent or incandescent lamps, may also be used. The optical system may include a "contact image sensor" or CIS to focus the image of the illuminated scan line onto the surface of the detector. Alternatively, a lens and/or mirror assembly may be used to collect and focus light from the illuminated scan region onto the detector.

The photosensitive detector used to detect the image light focused thereon by the optical system typically comprises a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the object being scanned or it may be transmitted through the object. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

The hand-held scanner device may be provided with a position sensing or "navigation" system in order to determine the position of the hand-held scanner with respect to the object being scanned. Accordingly, such a position sensing system allows the scanner to correlate its position with respect to the object being scanned. The position correlation allows a complete image of the scanned object to be produced even though the scanner may not scan the entire object during a single pass or "swipe." For example, if two or more swipes of the object are required to scan the entire object, then the position correlation provided by the navigation system will allow the various portions of the scanned image data to be "stitched" together to form a single unitary image representative of the entire scanned object.

One type of navigation system utilizes a pair of optical sensors to detect certain inherent structural features (e.g., surface roughness, paper fiber orientation, etc.) contained on the object being scanned (e.g., a sheet of paper with text or images thereon). Examples of the foregoing type of navigation system are disclosed in U.S. Pat. No. 5,089,712 of Holland for "Sheet Advancement Control System Detecting Fiber Pattern of Sheet," and U.S. Pat. No. 5,578,813 of Allen, et al., for "Freehand Image Scanning Device which Compensates for Non-Linear Movement," both of which are specifically incorporated herein by reference for all that they disclose.

One problem associated with many hand-held scanners relates to the ability to maintain the appropriate positional relationship between the illumination and optical systems and the object being scanned. Generally speaking, it is desirable to maintain the optical system at right angles to the surface of the object, although other angles may be used depending on the particular design of the scanner. In any event, if the illumination and, particularly, the optical systems, are not maintained at the proper orientation, the result can be an out of focus image on the detector with a commensurate decrease in scanned image quality. In cases of extreme positional deviation, the resulting image data may be useless. If the hand-held scanner is provided with a position sensing system, such positional deviations may compromise the effectiveness of that system as well.

To illustrate the foregoing problems, a hand-held scanner having a position sensing system may be capable of relatively high scanning speeds (e.g., 18 inches/sec). At such high scanning speeds it is difficult for the user to maintain the proper scanner orientation, particularly when changing scan directions, such as is required at the edge of the document.

The foregoing positional deviation issue does not present a serious problem in desktop and/or flat-bed scanners since the mechanical arrangement of the scanners usually precludes any significant positional deviations between the optical system and the object being scanned. However, the same is not true for many hand-held scanners. That is, since a hand-held scanner is moved by hand across the object being scanned, there is a significant likelihood that the user will induce significant positional deviations by rocking and/or tilting the scanner while sweeping it over the object. While skillful users may be able to sweep the hand scanner over the object without significant positional deviations, the scanning process can be considerably more difficult and frustrating for less-skilled and/or novice hand scanner users.

Therefore, a need exists for a hand scanner that will allow a user to more easily maintain the proper positional relationship between the scanner optics and the object being scanned in order to more consistently produce high-quality scanned image data.

SUMMARY OF THE INVENTION

Hand-held image scanner apparatus may comprise a body having first and second side walls positioned in spaced-apart relation so that the second side wall is located a spaced distance from the first side wall. The body also includes a convex face portion that extends between the first and second side walls and defines a contact axis that extends along a lateral direction and that is located longitudinally between the first and second side walls. The convex face portion allows the body to be tilted about the contact axis when the convex face portion is in contact with an object to be scanned. An image sensing system mounted within the body is responsive to image light reflected by the object being scanned and produces an image signal based on the image light. The image sensing system is optically coupled to an image light opening in the convex face portion of the body so that image light passing through the image light opening is received by the image sensing system.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
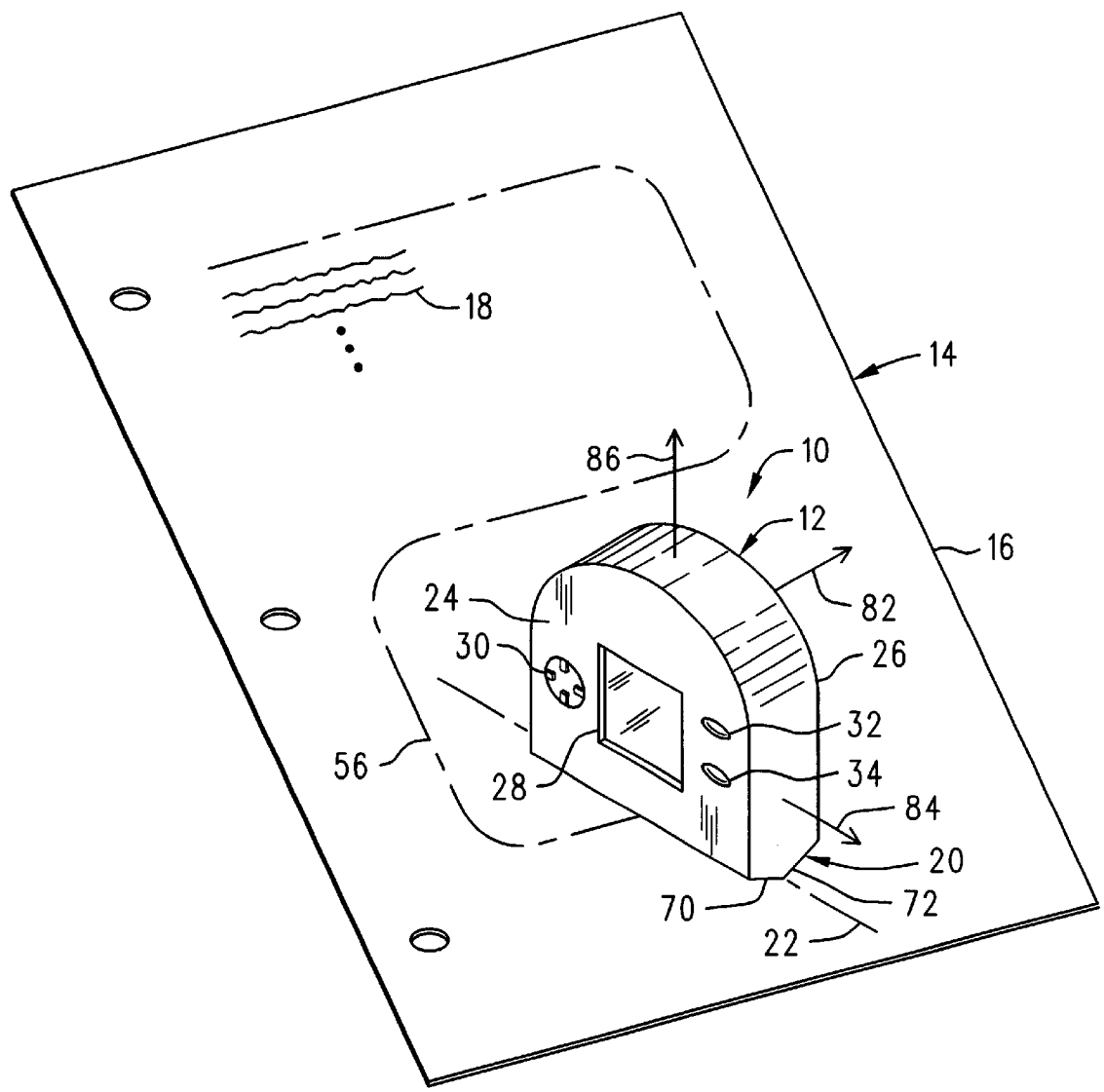
FIG. 1 is a perspective view of a hand-held image scanner apparatus having a tilting body according to the present invention.

A portable or hand-held image scanner apparatus 10 having a tilting body 12 is shown in FIG. 1 as it could be used to scan an object 14, such as a document 16 with written text 18 provided thereon. The tilting body 12 of scanner 10 is provided with a convex scan head or face portion 20 that defines a contact axis 22 that is located longitudinally between the two side walls 24 and 26 of the body 12 of scanner 10. The convex scan head or face portion 20 allows the user (not shown) to slightly tilt the body 12 of the scanner 10 about the contact axis 22 during the scan operation, but without affecting the operation of the scanner 10.

Figure 2:
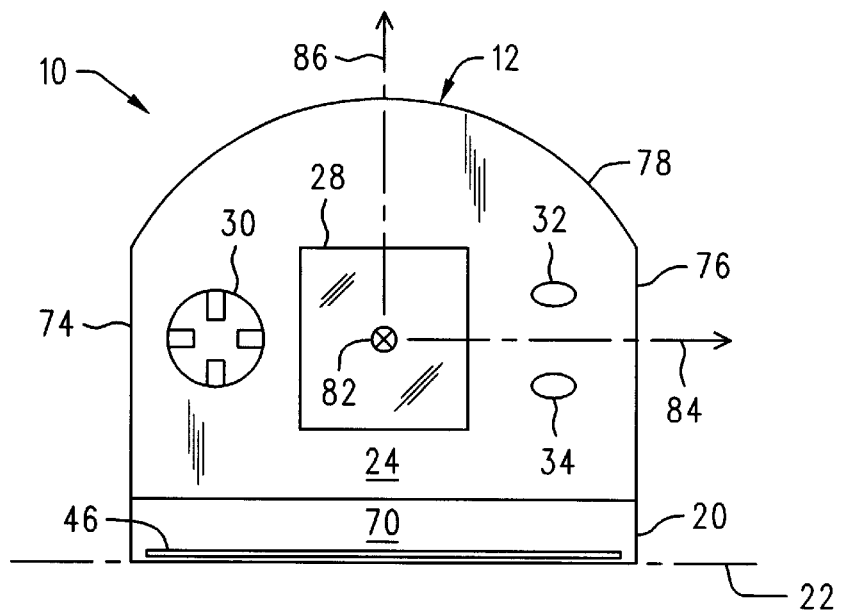
FIG. 2 is a front view in elevation of the hand-held image scanner apparatus shown in FIG. 1.

With reference now primarily to FIGS. 1 and 2, the main body 12 of hand-held scanner apparatus 10 may comprise an overall configuration or shape conducive to hand manipulation by a user (not shown). For example, in one preferred embodiment, the main body 12 may include first and second side wall portions 24 and 26 that are positioned in generally spaced-apart relation so that they define front and back side portions, respectively, of the main body 12. The first and second side wall portions 24 and 26 may be joined together at the ends by first and second end portions 74 and 76, and at the top by a top portion 78, as best seen in FIG. 2. The bottoms of the first and second side wall portions 24 and 26 may be joined together by the convex scan head or face portion 20.

Figure 3:
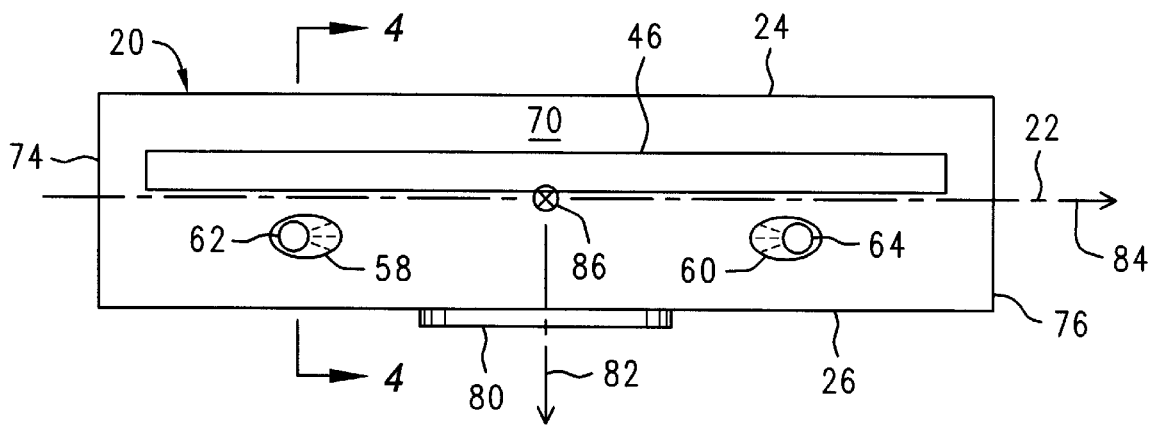
FIG. 3 is a plan view of the convex scan head of the image scanner apparatus showing the relative positioning of the image and navigation openings with respect to the contact axis.

The convex scan head or face portion 20 is best seen in FIGS. 2 and 3 and may comprise first and second angled face sections 70 and 72 which extend from the first and second side wall portions 24 and 26 of body 12. The first and second angled face sections 70 and 72 intersect along a contact axis 22 which is located longitudinally between the first and second side wall portions 24 and 26 and extends along the length of the convex scan head portion 20. See FIG. 3. The contact axis 22 forms the main line of contact when the convex scan head 20 is placed in contact with the object 14 being scanned. See FIGS. 1 and 4. As will be described in greater detail below, the first and second angled face sections 70 and 72 allow the body 12 of scanner 10 to be tilted slightly in the directions of arrows 88 about the contact axis 22, as best seen in FIGS. 4 and 5.

In addition to the external features described above, the main body portion 12 of hand-held scanner 10 may be sized to receive the various electronic components and systems required for the operation of the hand-held image scanner apparatus 10. For example, the main body 12 may be sized to receive an image processing system (not shown), as well as any other devices or systems that may be required or desired for the operation of the scanner 10. The body 12 may also be provided with a display device, such as a liquid crystal display 28, for displaying data relating to the function and operation of the hand-held image scanner 10. A plurality of function buttons or switches 30, 32, and 34 may be provided on the body 12 to control the function and operation of the hand-held image scanner 10. The back side 26 of scanner 10 may also be provided with a start/stop scan button or bar 80 (FIG. 3) to allow the user to initiate and terminate the scan operation. The electrical power required to operate the hand-held image scanner 10 may be provided by a suitable electrical power source, such as a battery (not shown), that may also be contained within the main body portion 12 of hand-held image scanner 10.

Figure 4:
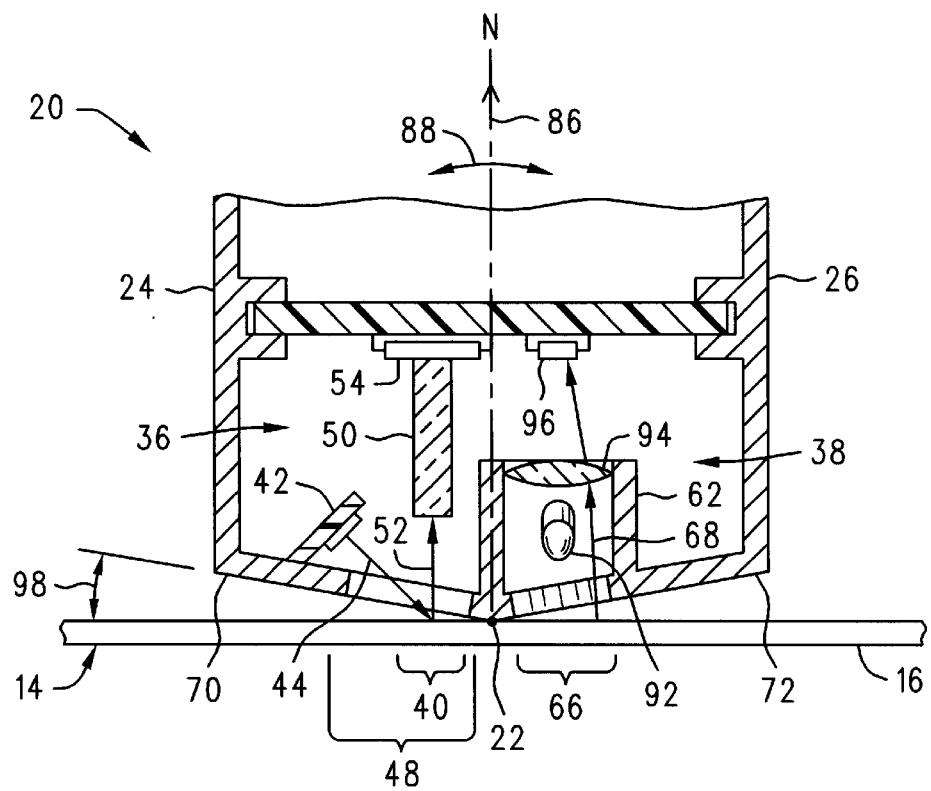
FIG. 4 is a cross-section view in elevation of the convex scan head of the hand-held image scanner apparatus taken along the line 4—4 of FIG. 3.
Figure 5:
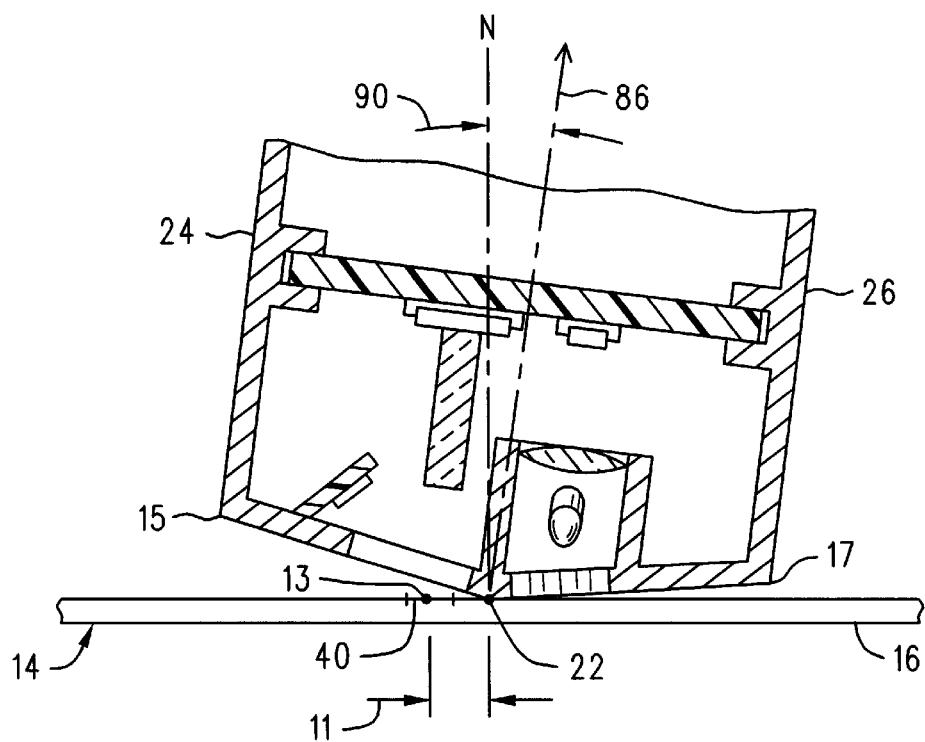
FIG. 5 is a cross-section view in elevation of the convex scan head shown tilted slightly about the contact axis.

The convex scan head or face portion 20 of body 12 may be configured to receive an image sensing system 36 and a navigation system 38, as best seen in FIG. 4. The image sensing system 36 produces an image signal (not shown) that is representative of a scan line 40 on the object 14 being scanned. In one preferred embodiment, the image sensing system 36 may comprise an illumination system 42 for directing light 44 onto the object 14. The light 44 passes through an image opening, such as an elongate slot 46 (FIG. 3), provided in the convex face 20 of body 12. The image opening 46 allows the light 44 from the illumination system 42 to illuminate a scan region 48 on the object 14. An optical system 50 directs image light 52 reflected by the illuminated scan region 48 on the object 14 to a detector array 54. The detector array 54 produces the image signal (not shown) which is representative of the image light 52 (i.e., the scan line 40).

As mentioned above, it is preferred, but not required, that the hand-held image scanner apparatus 10 be provided with a navigation system 38 which produces a navigation data signal (not shown) indicative of the position of the hand-held image scanner 10 with respect to the object 14 being scanned. The navigation system 38 allows the image scanner apparatus 10 to scan documents of nearly any size regardless of the size of the portable image scanner 10. For example, in the application illustrated in FIG. 1, the entire document 16 may be scanned by moving the portable image scanner 10 over the document 16 along a meandering or curvilinear scanning path 56. The meandering or curvilinear scanning path 56 may be thought of as defining one or more scanning passes or "swipes." Image data representative of the entirety of the scanned document 16 may then be obtained by stitching together the various image data pieces acquired by the scanner 10 during each swipe of the document 16. The various image data pieces may be stitched together based on position or navigation information provided by the navigation system 38.

Referring now to FIGS. 3 and 4, the navigation system 38 may include first and second navigation sensor openings 58 and 60 provided in the convex scan head 20 of body 12. The navigation sensor openings 58 and 60 define respective navigation areas (e.g., navigation area 66 shown in FIG. 4) on the object 14 being scanned and allow navigation light 68 reflected by the illuminated navigation area (e.g., navigation area 66) on the object 14 to be received by respective first and second navigation sensors 62 and 64. The first and second navigation sensors 62 and 64 produce respective first and second navigation data signals that are indicative of the position of the hand-held image scanner 10 with respect to the object 14 being scanned.

In order to scan the object 14 (e.g., a document 16 with written text 18 thereon), the user (not shown) may first position the scanner apparatus 10 on the document 16 so that the convex scan head or face 20 contacts the document 16. Ideally, the user will initially position the scanner 10 so that the main body 12 is essentially perpendicular to the document 16, in which case the main point of contact will be along the contact axis 22. See FIG. 4. Then, after making the appropriate selections with the function buttons (e.g., 30, 32, 34) the user may initiate the scanning process by pressing the start/stop bar 80 (FIG. 3) positioned on the back side 26 of the scanner 10 and thereafter sweeping the scanner 10 across the document 16 along the scanning path 56, as best seen in FIG. 1. Since the scanner 10 is hand-held, it is unlikely that the user will be able to hold the main body 12 completely square with regard to the document 16 during the sweep operation, e.g., the user may rock or tilt the body 12 to some degree during the sweep operation, as indicated by arrows 88 in FIG. 4. Since the convex scan head 20 contacts the document 16 along the contact axis, the user will be free to pivot or slightly tilt the body 12 about the contact axis 22. However, the magnitude of the tilt will be limited by the first and second angled face sections 70 and 72, which will contact the document 16 at the maximum tilt angle 90. This condition is illustrated in FIG. 5. The maximum tilt angle 90 should be selected so that the face of the object 14 being scanned will remain within the depth of field (i.e., region of focus) of both the image sensing system 36 and the navigation system 38. Accordingly, the convex face portion 20 allows the body 12 of the scanner 10 to be tilted by some amount, but not an amount sufficient to adversely affect the imaging or navigation functions of the scanner 10.

A significant advantage of the present invention is that the convex scan head 20 allows the main body 12 of scanner 10 to be tilted to some degree along the contact axis 22, but discourages the user from tilting the scanner beyond a predetermined maximum tilt angle 90, which would result in a loss of image quality and/or navigating ability. Accordingly, a satisfactory image can be captured by the scanner 10 without requiring the user to concentrate excessively on maintaining an exact perpendicular alignment with the document. Another advantage of the convex scan head 20 is that it allows the user a significant latitude in vertical alignment, but without requiring a separate pivoting or "floating" image head.

Having briefly described the hand-held image scanner apparatus 10 according to the present invention, as well as some of its more significant features and advantages, the various embodiments of the hand-held image scanner according to the present invention will now be described in detail. However, before proceeding with the description, it should be noted that while the hand-held image scanner apparatus 10 is shown and described herein as it may be used to scan an object 14, such as a document 16 with written text 18 thereon, it is not limited to use with any particular type of object 14. Indeed, the hand-held scanner apparatus 10 may be used to scan almost any type of object imaginable. Also, it is possible to move the hand-held image scanner 10 over the object 14 being scanned in essentially an infinite number of varying meandering or curvilinear scanning paths. Consequently, the present invention should not be regarded as limited to being moved over the particular meandering scanning path 56 shown and described herein.

With the foregoing considerations in mind, one embodiment of a hand-held scanner 10 having a tilting body 12 is shown in FIG. 1 as it may be used to scan an object 14, such as a document 16 with written text 18 provided thereon. As was mentioned above, it is generally preferred, but not required, that the hand-held scanner 10 be provided with a navigation system 38 (FIG. 4) which produces a navigation signal (not shown) indicative of the position of the hand-held image scanner 10 with respect to the object 14 being scanned. The navigation system 38 allows the hand-held image scanner 10 to scan an object 14 of nearly any size by merely moving the scanner 10 along a meandering or curvilinear scanning path 56 so that the scanner 10 passes over substantially the entirety of the portion of the object 14 that is to be scanned. The meandering path 56 may be thought of as defining a plurality of scanning "swipes." Image data (not shown) collected by the hand-held image scanner 10 during each of the scanning swipes thereafter may be stitched together by an image processor (not shown) with the aid of navigation data provided by the navigation system 38 to provide image data representative of the entirety of the scanned object 14.

Before proceeding with the description of the various embodiments of the hand-held scanner 10 having a tilting body design 12, it is useful to define a few terms that will be used herein to describe the various features and attributes of the scanner. First, it is useful to define a body coordinate system that is fixed with respect to the main body 12 of scanner 10. The body coordinate system then may be used to more clearly define certain geometrical relationships between various components of the scanner 10. Referring now to FIG. 1, such a body coordinate system may comprise a longitudinal axis or direction 82, a lateral axis or direction 84, and a vertical axis or direction 86. Second, the term "convex" as used herein refers to those components and objects having surfaces or boundaries that extend or bulge outwardly, regardless of whether the extension or bulge comprises a plurality of planar surfaces or a single curved surface.

Referring back now to FIGS. 1–3, the main body portion 12 of hand-held image scanner 10 may comprise an overall configuration or shape that is conducive to hand manipulation by a user (not shown), although other configurations may also be used. By way of example, in one preferred embodiment, the main body portion 12 may include first and second side wall portions 24 and 26, both of which extend generally in the lateral and vertical directions 84 and 86, thus define generally planar surfaces that may be referred to herein in the alternative as the front and back surfaces, respectively, of scanner 10. The first and second side wall portions 24 and 26 are separated in the longitudinal direction 82 by first and second end portions 74 and 76. In the embodiment shown and described herein, the first and second side wall portions 24 and 26 have curved top sections and may be joined together by a curved top wall 78, as best seen in FIG. 1. Alternatively, other configurations are possible, and the present invention should not be regarded as limited to a main body portion 12 having the particular shape or configuration shown and described herein.

The bottom of the main body portion 12 of hand-held image scanner 10 may be formed by a convex scan head or face portion 20. The scan head or face portion 20 defines a contact axis 22 that extends along the lateral direction 84 and is located longitudinally between the first and second side wall portions 24 and 26, as best seen in FIGS. 1 and 3. The contact axis 22 is formed by the intersection of first and second angled face sections 70 and 72 which extend from respective side wall portions 24 and 26, in the manner best seen in FIGS. 1 and 4. As will be described in greater detail below, the angle 98 (FIG. 4) that each angled face section 70, 72 makes with the object 14 when the vertical axis 86 of body 12 is coincident with the normal N of the object 14 should be selected so that the illuminated scan region 48 and the illuminated navigation area 66 will remain within the depth of field (i.e., focus region) of the respective image sensing and navigation systems 36 and 38.

The main body 12 may be made from any of a wide variety of materials, such as metals, plastics, or composite materials, suitable for the intended application. Accordingly, the present invention should not be regarded as limited to a main body portion comprising any particular material. However, by way of example, in one preferred embodiment, the main body portion 12 may comprise an injection molded plastic material (e.g., a polycarbonate plastic) reinforced with about 20% by weight glass fibers, although the presence of a reinforcing material is not required. Alternatively, other materials may also be used.

In addition to the external features described above, the main body portion 12 of hand-held image scanner 10 may be sized to receive the various electronic components and systems required for the operation of the hand-held image scanner apparatus 10. For example, the main body 12 may be sized to receive an image processing system (not shown) such as, for example, a microprocessor and associated random access memory (RAM), read-only memory (ROM), and mass data storage system (not shown), as well as any other devices or systems that may be required or desired for the operation of the scanner 10. Alternatively, some or all of the various electronic components may be located elsewhere and may be connected to the main body portion 12 by a suitable data link (not shown). The main body portion 12 may also be provided with a display system 28, such as a liquid crystal display (LCD), and various switching devices 30, 32, and 34 that may be required or desired for the operation of the hand-held image scanner 10. The main body 12 of scanner 10 may also be provided with a start/stop switch or bar 80 which, in one preferred embodiment, may be located on the back side 26 of body 12. Alternatively, the various switching devices 30, 32, 34, and 80 may be located at other positions on the hand-held image scanner 10. The electrical power required to operate the scanner 10 may be provided by a suitable electrical power source, such as a battery (not shown), that may also be contained within the main body portion 12 of image scanner 10. However, since the various electronic components, display devices, and batteries that may be required or desired for use in a particular hand-held image scanner are well-known in the art and since descriptions of the various components are not required to understand or practice the present invention, the various components (e.g., electronic components (not shown), display device 28, switching devices 30, 32, 34, and 80, etc., utilized in one preferred embodiment of the present invention will not be described in further detail herein.

The convex scan head or face portion 20 of body 12 may be configured to receive an image sensing system 36 and a navigation system 38, as best seen in FIG. 4. Essentially, the image sensing system 36 produces an image signal (not shown) that is representative of a scan line 40 contained within the illuminated scan region 48 on the object 14 being scanned. In one preferred embodiment, the image sensing system 36 may comprise an illumination system 42 for directing light 44 onto the object 14. The light 44 passes through an image opening, such as an elongate slot 46 (FIG. 3), provided in the convex face 20 of body 12. The image opening 46 allows the light 44 from the illumination system 42 to illuminate the scan region 48 on the object 14. An optical system 50 directs image light 52 reflected by the illuminated scan region 48 on the object 14 to a detector array 54. The detector array 54 produces the image signal (not shown) which is representative of the image light 52 (i.e., the scan line 40).

The various components of the image sensing system 36 may comprise any of a wide range of components and devices that are well-known in the art. For example, in one preferred embodiment, the illumination system 42 may comprise an array of light emitting diodes (LEDs) which produce light 44 of a brightness to sufficiently illuminate the scan region 48 on the object 14. Alternatively, other types of light sources, such as incandescent or fluorescent light sources, could also be used. It is preferred, but not required, that the optical system 50 used to direct and focus the image light 52 onto the surface of the detector array 54 comprise a contact image sensor, such as a contact image sensor of the type sold under the trademark "SELFOC" which is a registered trademark of the Nippon Sheet Glass Company, Limited. Briefly, a SELFOC lens array comprises a plurality of short, light transmitting rods positioned adjacent one another. The rods are "doped" so that the index of refraction of each rod varies radially across the rod. Accordingly, each rod is capable of focusing the image light onto the detector array 54 without the need for a separate focusing lens. In an alternative embodiment, other types of optical systems, such as projection imaging systems, could also be used. The detector array 54 may comprise a CCD array having a resolution of 300 ppi (pixels per inch), such as type TS105, available from Texas Instruments, Inc., of Austin, Tex. Alternatively, other types of detectors having other resolutions could also be used.

The optical system 50 utilized in one preferred embodiment has a depth of field (i.e., a focus region) of about ±0.5 mm. That is, features on the object 14 located within the depth of field of the optical system 50 will be sufficiently focused on the detector 54 so that the features may be successfully detected by the image sensing system 36.

The navigation system 38 may also be housed within the convex scan head or face portion 20 of the hand-held image scanner 10. In one preferred embodiment, the navigation system 38 may comprise a navigation system of the type shown and described in U.S. patent application Ser. No. 09/045,603 filed Mar. 20, 1998, now U.S. Pat. No. 6,002,124, and entitled "Portable Image Scanner with Optical Position Sensors" which is incorporated herein by reference for all that it discloses. Alternatively, the navigation system 38 may comprise a navigation system of the type shown and described in U.S. Pat. Nos. 5,089,712 of Holland, entitled "Sheet Advancement Control System Detecting Fiber Pattern of Sheet" and U.S. Pat. No. 5,578,813, of Allen et al., entitled "Freehand Imaging Scanning Device which Compensates for Non-Linear Movement," both of which are specifically incorporated herein by reference for all that they disclose. Essentially, the navigation system 38 may comprise first and second navigation sensors 62 and 64 which view or monitor corresponding first and second navigation areas (e.g. navigation area 66 (FIG. 4)) via respective first and second navigation sensor openings 58 and 60 (FIG. 3). Since each navigation sensor 62 and 64 is essentially identical, only the first navigation sensor 62 will be described herein.

Referring now primarily to FIG. 4, the first navigation sensor 62 may comprise a light source 92 for illuminating a navigation area 66 defined by the first navigation sensor opening 58. A lens 94 focuses navigation light 68 reflected by the illuminated navigation area 66 onto the surface of a two-dimensional detector array 96. The two-dimensional detector array 96 produces a first navigation data signal that is related to the navigation light 68. Essentially, then, the two-dimensional detector array 96 is responsive to inherent structural features on the object being scanned.

As used herein, the term "inherent structural features" refers to those features of the object 14 being scanned that are characteristic of the object 14 and are independent of forming image data and/or systematic registration data on the object 14. For example, if the object 14 being scanned comprises a paper document 16, the inherent structural features of interest may be paper fibers. As another example, if the object comprises a glossy document or an overhead transparency film, then the inherent structural features of interest may comprise specular reflection fields produced by the illuminated navigation area 66. In any event, the navigation data signal (not shown) produced by the two-dimensional detector 96 is related to inherent structural features of the object 14.

The various components just described that comprise the navigation system 38 may comprise any of a wide range of components shown and described in the U.S. patent application and issued patents referred to above. For example, in one preferred embodiment, the light source 92 may comprise a light emitting diode positioned so that light produced thereby is incident on the object at a grazing angle which may be in the range of about 5 degrees to about 30 degrees (the grazing angle is the complement of the angle of incidence). Alternatively, the light could be incident at substantially normal angles if specular fields are to be detected. The lens 94 may comprise a telecentric type lens, although lenses of other types may also be used.

The two-dimensional detector array 96 may comprise a two-dimensional CCD array having dimensions of 48 by 48 pixels and having a resolution of about 600 dpi. Alternatively, arrays having different sizes and/or resolutions could also be used. However, since the navigation system and method for detecting and processing navigation data relating to the inherent structural features contained on the object 14 being scanned are described in great detail in U.S. patent application and issued patents referred to above, and since the details associated with the foregoing devices and processes are not required to understand or practice the present invention, the navigation system 38 and method for detecting and processing navigation data that may be used in one preferred embodiment of the invention will not be described in further detail herein.

As was the case for the image sensing system 36, the navigation system 38 utilized in one preferred embodiment of the scanner 10 has a depth of field (i.e., a focus region) of about ±0.5 mm. That is, inherent structural features on the object 14 located within the depth of field of the navigation system 38 will be sufficiently focused on the detector 96 so that the inherent structural features may be successfully detected by the navigation system 38.

As was briefly mentioned above, the convex scan head or face portion 20 of main body 12 may be provided with a pair of angled face sections 70 and 72 that intersect along (i.e., define) a contact axis 22. The convex scan head 20 therefore allows the body 12 of scanner 10 to be tilted to some degree about the contact axis 22, i.e., generally in the directions indicated by arrows 88. See FIG. 4. In the embodiment shown and described herein, the various components of the image sensing system 36 are arranged so that the illuminated scan region 48 is located generally in the middle of the depth of field of the optical system 50 when the vertical axis 86 of the body 12 is coincident with the normal N of the object 14 being scanned. Similarly, the various components of the navigation system 38 are also arranged so that the illuminated navigation area 66 is located generally in the middle of the depth of field of the navigation system 38 when the vertical axis 86 of the body 12 is coincident with the normal N of the object 14 being scanned.

The foregoing arrangement of the image sensing and navigation systems 36 and 38 will allow the main body 12 of scanner 10 to be tilted to some degree about the contact axis 22, but without moving either the illuminated scan region 48 or navigation area 66 outside the depth of field associated with the respective image sensing or navigation systems 36 and 38. The angle 98 that each angled face section 70 and 72 makes with the object 14 when the vertical axis 86 of the main body 12 is aligned with the normal N is selected so that neither the illuminated scan region 48 nor the navigation area 66 will move outside the focus regions (i.e., depths of field) associated with the respective image sensing and navigation systems 36 and 38 when the body 12 of scanner 10 is tilted so that either of the two angled face sections 70 and 72 is flat against the document 16. See FIG. 5.

The angle 98 may be determined by taking the inverse tangent of the ratio of the horizontal distance 11 between the contact axis 22 and the mid-point 13 of the scan line 40 and half of the length of the depth of field of the image sensing system 36. For example, in the embodiment shown and described herein wherein the depth of field of the imaging sensing system 36 is about ±0.5 mm and the length 11 between the contact axis 22 and the mid-point 13 of the scan line 40 is about 2.0 mm, the angle 98 is calculated to be about 14.0 degrees. A similar method may be used to calculate the angle for the second angled face section 72, except that the method will be based on the location of the mid-point of the navigation area 66 and the depth of field of the navigation system 38. In the embodiment shown and described herein, the angle of the second angled face section 72 is selected to be the same as the angle 98 for the first angled face section 70.

The first and angled face sections 70 and 72 encourage the user (not shown) to tilt the body 12 of the scanner 10 about the contact axis 22 up to a maximum angle 90 (which is essentially congruent with angle 98). Even when tilted at the maximum angle 90, the scanner will still be capable of operation since the illuminated scan line 40 and the navigation area 66 remain in focus, thus detectable by the imaging sensing and navigation systems 36 and 38. While it would be possible to tilt the body 12 beyond the maximum angle 90, such an extreme tilt would require the body 12 to pivot, not about the contact axis 22, but rather about either corner point 15, 17 defined by the respective intersections of the first and second side wall portions 24, 26 with the first and second angled face sections 70, 72. See FIG. 5. However, such a condition is discouraged by the geometry of the convex face portion 20 and would be noticed by the user as being an excessive tilt angle.

The hand-held scanner 10 having the tilting body 12 according to the present invention may be operated as follows to scan the object 14 (e.g., a document 16 with written text 18 thereon). As a first step, the user may position the scanner apparatus 10 so that the convex scan head or face 20 contacts the document 16. Ideally, the user will initially position the scanner 10 so that the vertical axis 86 of the main body 12 is coincident with the local normal N of the object 14, as best seen in FIG. 4, although this is not required. So positioned, the main point of contact between the scanner 10 and document 16 will be along the contact axis 22. After making the appropriate selections with the function buttons (e.g., 30, 32, 34) the user may initiate the scanning process by pressing the start/stop bar 80 (FIG. 3) positioned on the back side 26 of the scanner 10 and by sweeping the scanner 10 across the document 16 along the scanning path 56, as best seen in FIG. 1. Since the scanner 10 is hand-held, it is unlikely that the user will be able to hold the main body 12 completely square with regard to the document 16 during the sweep operation, e.g., the user may rock or tilt the body 12 to some degree during the sweep operation, as indicated by arrows 88 in FIG. 4. The convex scan head 20 allows the user to pivot or slightly tilt the body 12 about the contact axis 22, but, by tactile feel, discourages the user from tilting the body 12 beyond the maximum angle 90 at which one or the other of the angled face sections (e.g., 72) lies flat against the document 16. Since the maximum tilt angle 90 is selected so that the surface of the object 14 remains within the depth of field (i.e., region of focus) of both the image sensing system 36 and the navigation system 38, the result will be a successful scan of the document 16 even though the user may be tilting the scanner 10 about the contact axis 22.

Figure 6:
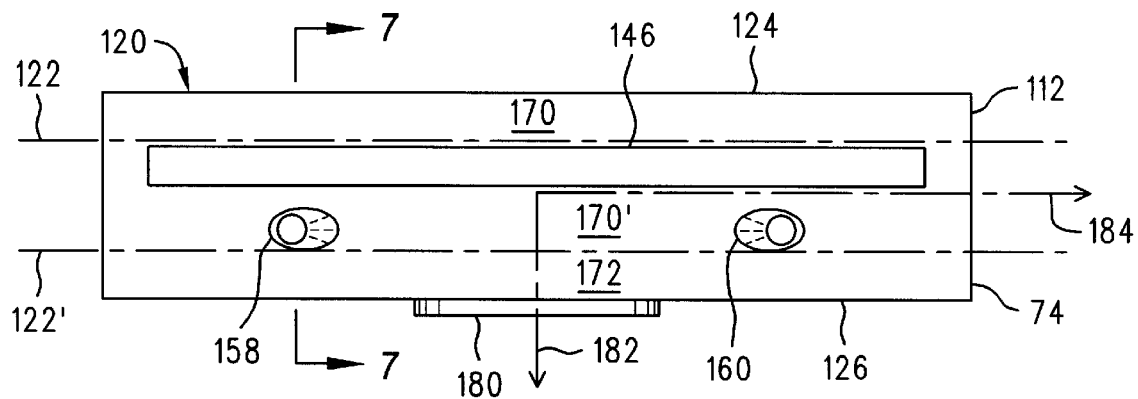
FIG. 6 is a plan view of a second embodiment of a convex scan head that defines two contact axes and showing the relative positioning of the image and navigation openings with respect to the two contact axes.
Figure 7:
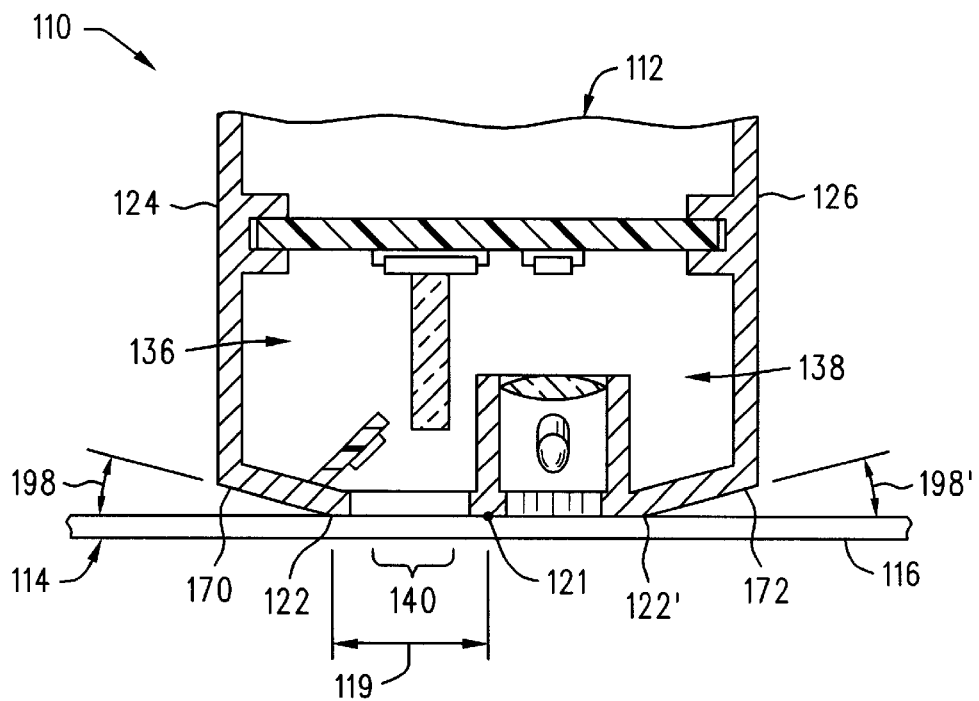
FIG. 7 is a cross-section view in elevation of the second embodiment of the convex scan head taken along the line 7—7 of FIG. 6.
Figure 8:
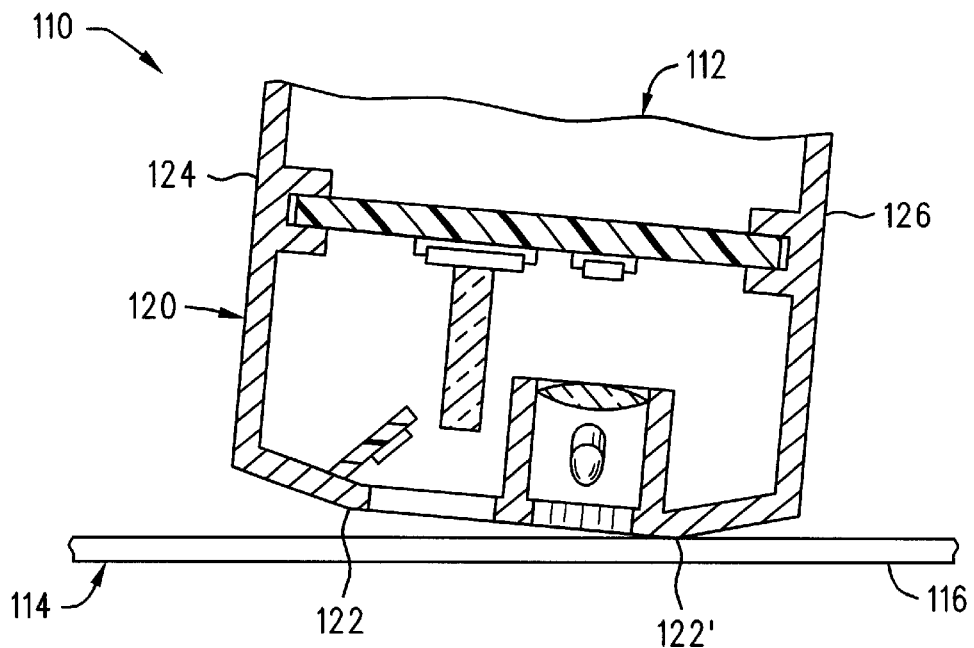
FIG. 8 is a cross-section view in elevation of the second embodiment of the convex scan head shown tilted slightly about one of the two contact axes.

The convex face portion 20 may take on different configurations from the one just described and still remain within the scope of the present invention. For example, a second embodiment 110 of an image scanner having a tilting body 112 is shown in FIGS. 6–8. The second embodiment differs from the first embodiment shown and described above in that the convex scan head or face portion 120 of the second embodiment 110 defines two contact axes 122 and 122'. The convex face portion 120 therefore allows the body 112 of scanner 110 to pivot about either contact axis 122 or 122'.

Referring now specifically to FIGS. 6 and 7, the convex face portion 120 may comprise first and second angled face sections 170 and 172 that extend from respective first and second side wall portions 124 and 126 of main body 112. The first and second angled face sections 170 and 172 are joined together by a flat face section 170'. Accordingly, the convex face portion 120 defines not one, but rather two contact axes 122 and 122' that are located longitudinally between the first and second side wall portions 124 and 126 of main body 112. The convex face section 120 may be provided with an image opening, such as an elongate slot 146, as well as a pair of navigation openings 158 and 160, all of which are located substantially between the two contact axes 122 and 122', as best seen in FIG. 6. Alternatively, the various openings 146, 158, and 160 need not be all located longitudinally between the two contact axes 122 and 122', but could instead be partially or completely located outboard of the contact axes 122 and 122', although this is generally not preferred.

As was the case for the first embodiment described above, the angle 198, 198' that the respective angled face sections 170, 172 make with the document 116 should be selected so that the maximum tilt angle allowed thereby (i.e., when the body 112 is tilted so that either angled face section 170, 172 lies flat against the document) will move neither the illuminated scan region 148 nor the navigation area 166 outside the depth of field (i.e., focus region) of the respective image sensing or navigation systems 136 and 138.

The method for calculating the angles 198, 198' differs slightly from the first embodiment and will now be described. The angle 198 between the first angled face section 170 the document 116 may be calculated by taking the inverse tangent of the ratio of the horizontal distance 119 between the first contact axis 122 and the mid-point or centroid 121 of the navigation area 166 and one half the depth of field of the navigation system 138. For example, in the embodiment shown and described herein wherein the depth of field of the navigation system 138 is about ±0.5 mm and the length 119 between the first contact axis 122 and the mid-point or centroid 121 of the navigation area 166 is about 4.0 mm, the angle 198 is calculated to be about 7.0 degrees.

A similar method may be used to calculate the angle 198' for the second angled face section 172, except that the method will be based on the horizontal distance between the mid-point of the scan line 140 and the second contact axis 122', and the depth of field of the image sensing system 136. For example, in the embodiment shown and described herein, wherein the depth of field of the image sensing system 136 is about ±0.5 mm and the length between the second contact axis 122' and the mid-point of the scan line 140 is about 4.0 mm, the angle 198' of the second angled face section 172 is calculated to be 7.0 degrees. Alternatively, the second angle 198' may be selected to be the same as the angle 198 or vice-versa.

The convex scan head or face portion 120 allows the user to pivot or slightly tilt the body 112 about either contact axis 122, 122', but, by tactile feel, discourages the user from tilting the body 112 beyond the maximum angle at which one or the other of the angled face sections 170, 172 lies flat against the document 116. Since the maximum tilt angle is selected so that the surface of the object 114 remains within the depth of field (i.e., region of focus) of both the image sensing system 136 and the navigation system 138, the result again will be a successful scan of the document 116 even though the user may be tilting the scanner 110 about either contact axis 122, 122'.

Figure 9:
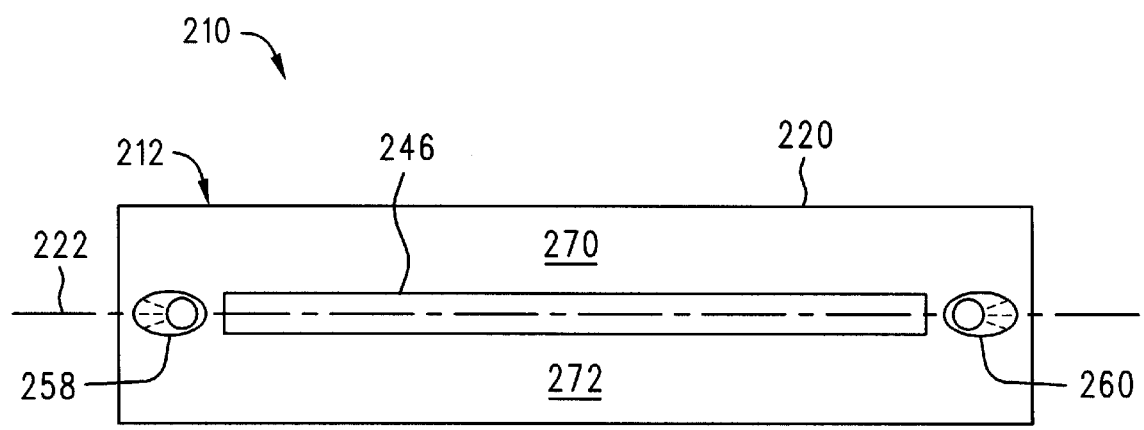
FIG. 9 is a plan view of a third embodiment of a convex scan head having the image and navigation openings aligned with the single contact axis.

Still other variations of the invention are possible. For example, a third embodiment 210 of an image scanner having a tilting body 212 is shown in FIG. 9 and may comprise a convex scan head 220 that defines a single contact axis 222. The main difference between the third embodiment 210 and the first embodiment 10 is that the image opening 246 is generally aligned with the contact axis 222 and the navigation openings 258 and 260 are located adjacent the lengthwise ends of the image opening 246. The angles of the respective angled face sections 270 and 272 may be calculated in the manner described above, except that the alignment of the image and navigation openings 246, 258, and 260 with the contact axis 222 would allow considerably larger angles (e.g., 98 (FIG. 4)) to be used since the main body portion 212 could be tilted by a substantial angle before the object being scanned would move outside the depth of focus of either the imaging or navigation systems.

Figure 10:
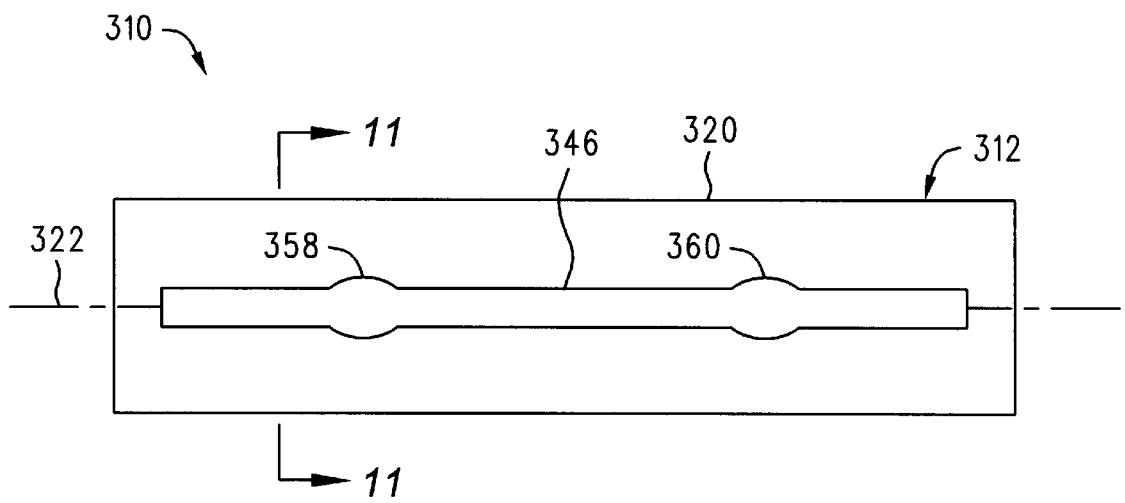
FIG. 10 is a plan view of a fourth embodiment of a convex scan head having the image opening aligned with the single contact axis and wherein the navigation openings comprise enlarged portions of the image opening.
Figure 11:
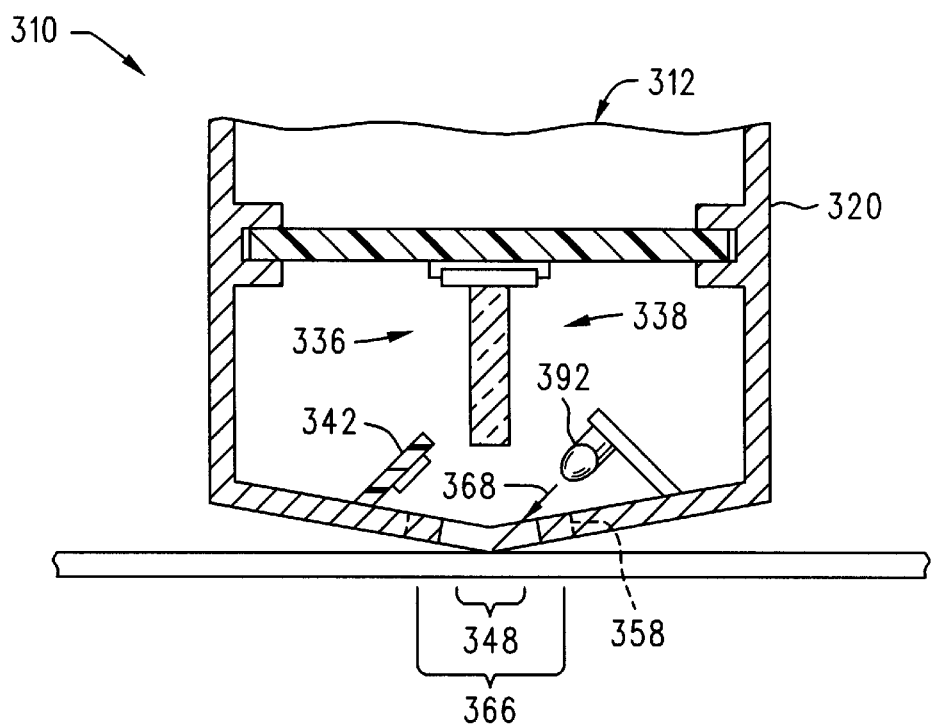
FIG. 11 is a cross-section view in elevation of the fourth embodiment of the convex scan head taken along the line 11—11 of FIG. 10.

A fourth embodiment 310 of an image scanner having a tilting body 312 is shown in FIGS. 10 and 11. The convex scan head or face portion 320 of the fourth embodiment may be essentially identical to that of the third embodiment, except that the two navigation openings 358 and 360 may comprise integral portions of the image opening 346. All of the openings (i.e., 346, 358, and 360) may be centered about the single contact axis 322, in the manner best seen in FIG. 10.

The image system 336 and navigation system 338 of the fourth embodiment 310 may be integrated to form a single system. For example, in the embodiment shown in FIG. 4, the navigation light source 392 may be position so that navigation light 368 therefrom is incident on the navigation area 366 defined generally by the enlarged navigation opening 358, as best seen in FIG. 10. The scan region 348 may be illuminated by a scan line illumination system 342 in the manner already described for the first embodiment. The light reflected by the illuminated scan and navigation areas 348 and 366 may then be detected by a single detector 54. Alternatively, separate navigation detectors (not shown) could be used in a manner similar to those already described for the other embodiments.

It is contemplated that the inventive concepts herein described may be variously otherwise embodied and it is intended that the appended claims be construed to include alternative embodiments of the invention except insofar as limited by the prior art.

What is claimed is:

1. Hand-held image scanner apparatus, comprising:
a body having:
  a first side wall extending in a lateral direction and oriented so that it is generally perpendicular to a longitudinal direction;
  a second side wall extending in the lateral direction and oriented so that it is generally perpendicular to the longitudinal direction, said second side wall being positioned a spaced distance from said first side wall;
  a convex face portion extending between said first and second side walls and having an opening therein, the convex face portion defining a first contact axis extending along a lateral direction and located longitudinally between said first and second side walls, said convex face portion allowing said body to be tilted in a first direction about the first contact axis when said convex face portion is in contact with an object to be scanned; and
an image sensing system mounted within said body, said image sensing system being responsive to image light reflected by the object being scanned and producing an image signal based on the image light, said image sensing system being optically coupled to the opening in the convex face portion of said body so that image light passing through the image light opening is received by said image sensing system.

2. The hand-held image scanner apparatus of claim 1, further comprising:
a first navigation sensor responsive to first navigation light reflected by the object being scanned and producing a first navigation data signal based on the first navigation light, said first navigation sensor being optically coupled to the opening in the convex face portion of said body so that first navigation light passing through the opening is received by said first navigation sensor; and
a second navigation sensor responsive to second navigation light reflected by the object being scanned and producing a second navigation data signal based on the second navigation light, said second navigation sensor being optically coupled to the opening in the convex face portion of said body so that second navigation light passing through the opening is received by said second navigation sensor.

3. The hand-held image scanner apparatus of claim 2, wherein the opening in the convex face portion of said body comprises a generally elongate slot that extends along the lateral direction, the generally elongate slot having first and second lengthwise ends.

4. The hand-held image scanner apparatus of claim 3, wherein the convex face portion of said body further comprises a first navigation sensor opening and a second navigation sensor opening positioned in spaced apart relation adjacent the generally elongate slot and wherein said first navigation sensor is optically coupled to said first navigation sensor opening and wherein said second navigation sensor is optically coupled to said second navigation sensor opening.

5. The hand-held image scanner apparatus of claim 4, wherein the first contact axis is located longitudinally between the generally elongate slot and said first and second navigation sensor openings.

6. The hand-held image scanner apparatus of claim 5, wherein the first and second navigation sensor openings are positioned a spaced-distance apart, the spaced-distance being less than a distance separating the first and second lengthwise ends of the generally elongate slot.

7. The hand-held image scanner of claim 6, wherein said convex face portion defines a second contact axis that extends along the lateral direction so that both the first and second contact axes are located longitudinally between said first and second side walls, said convex face portion allowing said body to be tilted in a second direction about the second contact axis when said convex face portion is in contact with the object to be scanned.

8. The hand-held image scanner apparatus of claim 7, wherein said image sensing system comprises a contact image sensor having a length extending substantially between the first and second lengthwise ends of the elongate slot in the convex face portion of said body.

9. The hand-held image scanner apparatus of claim 8, wherein each of said first and second navigation sensors comprise:
- an illumination system for directing light onto the object being scanned;
- a two dimensional array of optical sensor elements; and
- a focusing system positioned between said two dimensional array of optical sensor elements and the object for collecting and focusing light reflected by the object being scanned onto said two dimensional array of optical sensor elements.

10. The hand-held image scanner apparatus of claim 9, further comprising a processing system operatively associated with said image sensing system, said first navigation sensor, and said second navigation sensor, said processing system being responsive to the image signal and to the first and second navigation data signals, said processing system transforming said image signal based upon relative movement between said image sensing system and the object being scanned as determined by the first and second navigation data signals produced by said first and second navigation sensors to produce a transformed image data signal.

11. A body for a hand-held image scanner apparatus, comprising:
- a first side wall extending in a lateral direction and oriented so that it is generally perpendicular to a longitudinal direction;
- a second side wall extending in the lateral direction and oriented so that it is generally perpendicular to the longitudinal direction, said second side wall being positioned a spaced distance from said first side wall;
- a convex face portion extending between said first and second side walls and having an image light opening therein to allow image light to pass therethrough, said convex face portion defining a first contact axis extending along the lateral direction and located longitudinally between said first and second side walls, said convex face portion allowing said body to be tilted in a first direction about the first contact axis when said convex face portion is in contact with an object to be scanned.

12. The body of claim 11, wherein the image light opening comprises a generally elongate slot extending along the lateral direction, the generally elongate slot having first and second lengthwise ends.

13. The body of claim 12, further comprising a first navigation sensor opening and a second navigation sensor opening, said first and second navigation sensor openings being positioned in spaced apart relation adjacent the generally elongate slot.

14. The body of claim 13, wherein the first contact axis is located longitudinally between the generally elongate slot and said first and second navigation sensor openings.

15. The body of claim 14, wherein the first and second navigation sensor openings are positioned a spaced-distance apart, the spaced-distance being less than a distance separating the first and second lengthwise ends of the generally elongate slot.

16. The body of claim 11, wherein said convex face portion defines a second contact axis that extends along the lateral direction so that both the first and second contact axes are located longitudinally between said first and second side walls, said convex face portion allowing said body to be tilted in a second direction about the second contact axis when said convex face portion is in contact with the object to be scanned.

17. The body of claim 16, wherein the image light opening comprises a generally elongate slot extending along the lateral direction, the generally elongate slot having first and second lengthwise ends.

18. The body of claim 17, further comprising a first navigation sensor opening and a second navigation sensor opening, said first and second navigation sensor openings being positioned in spaced apart relation adjacent the generally elongate slot.

19. The body of claim 18, wherein the generally elongate slot and said first and second navigation sensor openings are located longitudinally between the first and second contact axes.

20. The body of claim 19, wherein the first and second navigation sensor openings are positioned a spaced-distance apart, the spaced-distance being less than a distance separating the first and second lengthwise ends of the generally elongate slot.

* * * * *